United States Patent [19]

Wais et al.

[11] Patent Number: 4,733,934

[45] Date of Patent: Mar. 29, 1988

[54] CONNECTOR FOR A FIBER OPTIC CABLE

[75] Inventors: Thomas Wais, Neckarsulm; Werner G. Schrott, Heilbronn, both of Fed. Rep. of Germany

[73] Assignee: Amphenol Corporation, Wallingford, Conn.

[21] Appl. No.: 859,575

[22] Filed: May 5, 1986

[30] Foreign Application Priority Data

May 14, 1985 [DE] Fed. Rep. of Germany ....... 3517388

[51] Int. Cl.⁴ .......................... G02B 6/36; H01J 5/16
[52] U.S. Cl. .................... 350/96.20; 350/96.10; 350/96.23; 250/227
[58] Field of Search ............. 350/96.20, 96.21, 96.10, 350/96.22, 96.23; 250/227

[56] References Cited

U.S. PATENT DOCUMENTS

| | | | |
|---|---|---|---|
| 3,792,284 | 2/1974 | Kaelin | 250/227 X |
| 4,101,198 | 7/1978 | Heldt | 350/96.20 |
| 4,625,333 | 11/1986 | Takezawa et al. | 350/96.20 |
| 4,693,550 | 9/1987 | Brown et al. | 350/96.20 |
| 4,695,124 | 9/1987 | Himono et al. | 350/96.20 |

FOREIGN PATENT DOCUMENTS

| | | | |
|---|---|---|---|
| 3113146 | 10/1982 | Fed. Rep. of Germany | 350/96.20 |
| 3303624 | 7/1984 | Fed. Rep. of Germany | 350/96.20 |
| 56-16105 | 2/1981 | Japan | 350/96.20 |
| 2042755 | 9/1980 | United Kingdom | 350/96.21 |

Primary Examiner—William L. Sikes
Assistant Examiner—Brian M. Healy
Attorney, Agent, or Firm—Bacon & Thomas

[57] ABSTRACT

Cable connector for a fiber optic cable with at least one cable seating hole to receive at least one optic fiber coated with a jacket for the purpose of tension relieving and centering the optic fiber. At least one electro-optic transducer is housed in the cable connector.

16 Claims, 12 Drawing Figures 4,733,934

CONNECTOR FOR A FIBER OPTIC CABLE

BACKGROUND OF THE INVENTION

1. Field of the Invention

The invention relates to a connector or a connecting element for a fiber optic cable.

2. Description of the Prior Art

Cable connectors for fiber optic cables have been known for some time. In one such known cable connector for a two-conductor fiber optic cable, the two conductors, i.e. the two fibers both of which have a light-impermeable jacket, are separated from each other, namely along a narrow web of jacket material connecting the two conductors. The two conductors are then inserted in a plastic part of two shells and extend to a face of the plastic part. A metal sleeve encloses the plastic part. This known connector additionally has a second component in which a plastic part is also disposed inside a metal housing, with leads going from this plastic part in one direction while electro-optic transducers are disposed in the other direction. The part containing the transducers can be coupled to the part containing the cable. It is obvious that this known cable connector is constructed of two components which are complicated per se and have to be aligned accurately.

Other disadvantages of this known cable connector include the fact that a relatively great number of individual parts is required; therefore, centering the light waveguide fibers with the involvement of different parts requires precise manufacturing tolerances. Moreover, there is a separation of the electro-optic component and the light waveguide fiber terminal.

It would be desirable to provide a cable connector which does not have the above disadvantages. In particular, it would be desirable to provide a cable connector having a low-cost connection arrangement, especially for plastic light waveguides to electro-optic elements. It is also desirable to provide a cable connector suited for occasional coupling and uncoupling.

SUMMARY OF THE INVENTION

In accordance with this invention, there is provided a cable connector for a fiber optic cable with at least one cable seating hole to receive at least one jacket coated optic fiber for the purpose of strain relieving and centering the optic fiber, characterized in that at least one electro-optic transducer is housed in the cable connector.

According to a first aspect of this invention, a cable connector for a fiber optic cable is provided with means being present in the cable connector to seat the optic cable. The cable seating means receives the cable comprised of fiber and jacket and centers the optic fiber. Also housed in the cable connector, centered with the optic fiber, is an electro-optic transducer. If the cable has several conductors or jacketed fibers, a corresponding number of electro-optic transducers are housed in the cable connector also. The cable is formed preferably of plastic, the fiber as well as the jacket. The cable connector is preferentially used in a so-called duplex cable.

This invention also provides a cable connector comprising a plastic cable seating part which interacts with a cable fastening part, the latter preferentially effecting the cable fastening by being screwed to the cable seating part.

To accommodate the transducer(s) in the cable connector, the latter's cable seating part is equipped with appropriate transducer seating cavities.

The cable seating part is preferably formed of plastic and is produced in one operation as a single-piece core by injecting molding. This is an extremely low-cost process which, however, assures at the same time that the cable is centered with the transducers to be inserted.

According to another aspect of this invention, the cable connector is connectable to the contact insert of a conventional plug connector by, for example, soldering the contact pins of the transducer(s) located in the cable connector to the contact pins of the contact insert. The unit thus formed can be inserted in a simple manner into the conventional plug connector, and provide tension relief by the already mentioned cable fastening part.

According to a further aspect of the invention, the cable connector according to this invention is directly fastenable to an apparatus wall by means of a nut screwable on a thread of the cable seating section which also serves to accommodate the cable fastening part.

According to another aspect of the invention, the mounting of the cable connector directly to a chassis can be provided by providing clamping means either as an integral part of the cable seating part or separate therefrom.

This invention thus provides a cable connector having a low cost connection arrangement, especially for plastic light waveguides to electro-optic elements. The cable connector can also be coupled and uncoupled.

This invention also provides a cable connector in which both the fiber optic cable (the light waveguide) and the electro-optic components are accommodated in a single element at the same time. The cable connector of this invention assures quick and uncomplicated connection, yet provides reliable tension relief. The connection provided by the cable connector is repeatable any number of times, without the need of assembly tools. The cable connector is producible at low cost and is preferably formed completely or mostly of plastic.

This invention further provides a hybrid plug connector which makes both optical transmission and electrical contacting possible, including transmission in two directions (duplex).

DESCRIPTION OF THE PREFERRED EMBODIMENTS

Figure 1:
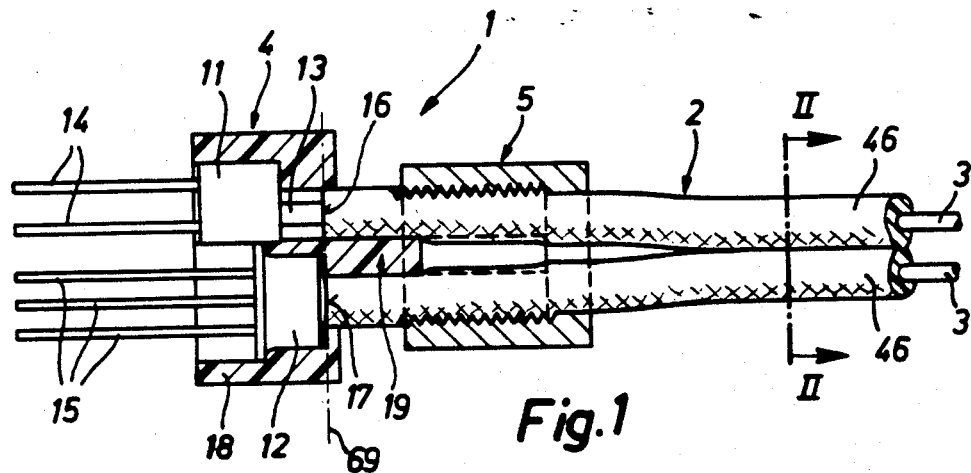
FIG. 1. shows a partly sectioned view of a cable connector according to the invention.

FIG. 1 shows a cable connector 1 according to this invention in its assembled state, i.e. a fiber optic cable 2 is already fastened to cable connector 1. In the following, the embodiment example of FIGS. 1 through 7 is referred to first, while three possible adaptations according to the invention for the cable connector 1 according to the invention are discussed later with reference to FIGS. 8 through 10.

The cable connector 1 has a cable seating part 4 and a cable fastening part 5. The cable seating part 4 accommodates cable 2 as well as one or more electro-optic transducers. In the embodiment example illustrated, two transducers are housed in the cable seating part 4, for example one electro-optic transmitter 11 and one electro-optic receiver 12.

To accommodate the transducers, cable seating part 4 has a transducer seating section 18, and to accommodate the cable a cable seating section 19. The two sections 18 and 19 are adjacent to each other and cover a length 37 and 38, respectively, as shown in FIG. 4.

Figures 3, 4, 5:
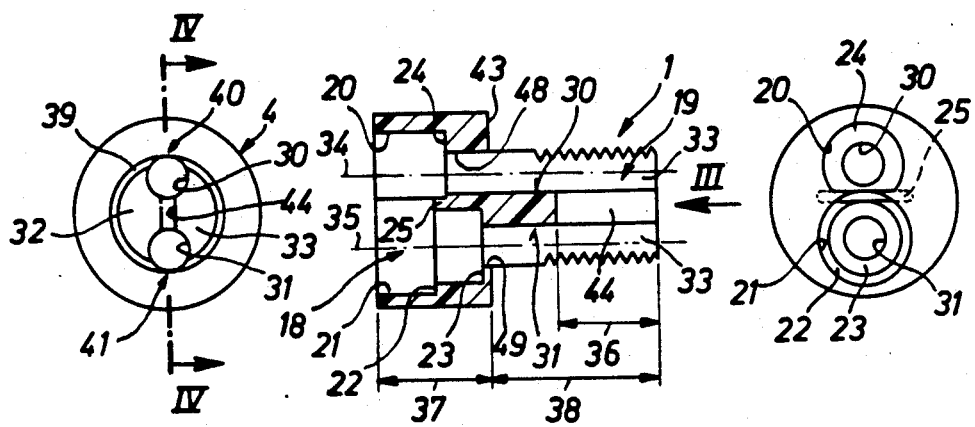
FIG. 3 shows a rear view of the cable connector from the direction of arrow III in FIG. 4.
FIG. 4 shows a section along line IV—IV in FIG. 3.
FIG. 5 is a front view of the cable connector of FIG. 4.

In the embodiment example illustrated, the transducer seating section 18 has transducer seating cavities 20 and 21 (see FIG. 4). The two cavities are separated by a partitioning wall 25. In the embodiment example illustrated, the partitioning wall 25 is an integral part of the cable seating part 4, but it could also be inserted in appropriately prepared slots in the cable seating part 4. The cavity 20 forms a stop surface 24 against which transmitter 11 can rest. Cavity 21 forms two stop surfaces 22 and 23 against which receiver 12 can rest. Transmitter 11 and receiver 12 have contact pins 14 and 15 through which electrical signals are fed in and out, and to which electric power can also be applied. Transmitter 11 also has a transmitting part 13, forming a transmitting area 16. Similarly, the receiver 12 forms a receiving area 17. The transmitting and receiving areas 16 and 17 preferably lie in a plane 69, such as the plane defined by the stop surface 23.

As is clearly shown in FIG. 1, the terminal end of cable 2 with its fibers 3 also lies in the said plane 69 so that a transition as free of losses as possible results.

Figure 2:
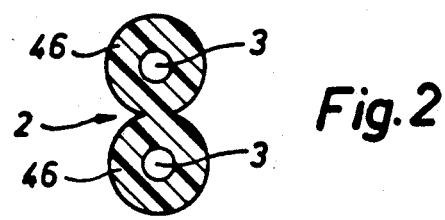
FIG. 2 shows a section along line II—II in FIG. 1.

In the embodiment example illustrated, the fiber optic cable 2 is of two-conductor design, i.e., it contains two fibers 3 enclosed by a jacket 46 (see FIG. 2). Accordingly, the cable seating section 19 is equipped with two cable seating holes 30 and 31. Cable seating holes 30 and 31 terminate at the plane 69.

To retain cable 2 in cable seating section 19, a cable fastening part 5 is provided in the form of a sleeve. Hereinafter, cable fastening part 5 is also called sleeve 5. Sleeve 5, detailed in FIG. 7, has a knurled portion 8 on its outside and an internal thread 47 on its inside diameter, adjacent to which, however, an unthreaded core hole 7 remains.

For interaction with sleeve 5, cable seating section 19 is equipped with an external thread 39. Like transducer seating section 18, cable seating section 19 is of round cross section, but is smaller in diameter than the transducer seating section. This is shown in FIG. 4.

Furthermore, cable seating section 19 is slotted over part of its length, this slot length being marked 36 in FIG. 4. Only one slot 44 is shown in the embodiment example, but it would be possible to provide more than just one slot, especially when a cable containing more than two conductors is used. Due to slot 44, in essence two cable fixing elements 32 and 33 are formed, as shown in FIG. 3. Like the entire cable seating part 4, the two cable fixing elements 32 and 33 are preferably made of plastic, preferably by injection molding. The two cable fixing elements 32 and 33 have a certain elasticity and can be pushed inwardly against the cable jacket 46 of cable 2. This is done when, after cable 2 has been inserted into the two diametrically opposed holes 30, 31, the internal thread 47 of sleeve 5 is next screwed on from the right in FIG. 4, the core bore 7 finally exerting, from a certain point on, a radial, inwardly directed pressure upon the two cable fixing elements 32 and 33 so that they, in turn, fix cable 2 in cable connector 1.

Figure 6:
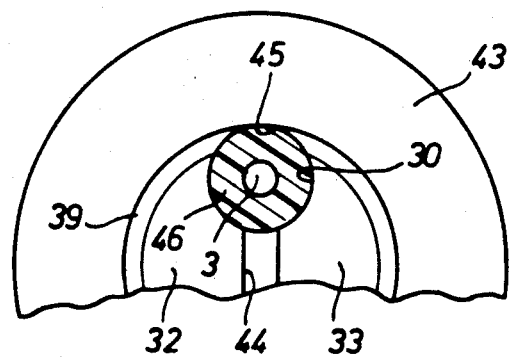
FIG. 6 is a detail at 40 in FIG. 3, with the cable inserted.
Figure 7:
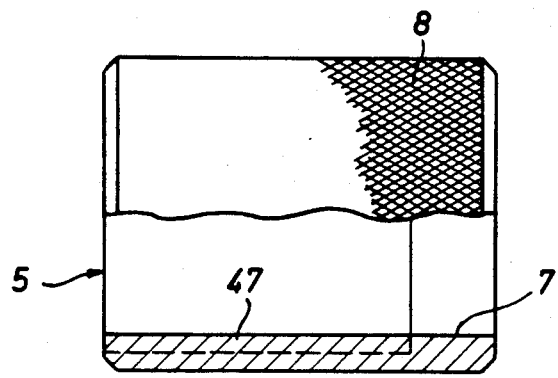
FIG. 7 is a partly sectioned side view of the cable fastening part.

Cable seating holes 30 and 31 are preferably arranged adjacent to external thread 39 of cable seating section 19 so that when sleeve 5 is screwed on, its internal thread 47 cuts into jackets 46 of the two conductors of cable 2. This is shown in FIG. 6 for cable seating hole 30 in an enlarged view. FIG. 6 thus shows a detail at 40 in FIG. 3. It may be seen that, preferably, slot 44 continues outwardly in slot 45 which cuts through external thread 39 so that a portion of jacket 46 lies in the bottom area of thread 39. As a result, when, as already mentioned, sleeve 5 is screwed on, its thread 47 will cut into this jacket area, forming in this manner an additional, extremely effective means to prevent cable 2 from shifting axially. This cutting of internal thread 47 of sleeve 5 into a part of the outer jacket of fiber optic cable 2 thus constitutes an excellent strain or tension relief. As at 40, cable jacket 46 also lies at 41 in the bottom area or cut area of thread 39 (or 47, respectively).

Cable connector 1 (see particularly FIG. 4) preferably has in transducer seating section 18 hole parts 48 and 49 aligned with the holes 30 and 31 in cable seating section 19. Hole part 48 is preferably of the same diameter as hole 30 and hole part 49 is preferably the same diameter as hole 33. Also, hole part 48 and hole 30 share the same longitudinal axis 34, and hole part 49 and hole 31 share the same longitudinal axis 35. When, as is often the case, the conductors of cable 2 (i.e. fiber 3 and jacket 46) are of the same diameter, then holes 30, 31 and the hole parts 48, 49 will naturally also have the same diameter. As shown in FIG. 1, the ends of cable 2 may project into hole parts 48 and 49.

External thread 39 preferably covers, on the far right of FIG. 4, the length 36 of slot 44 so that an unthreaded zone remains adjacent to the back surface 43 (see FIG. 4) of jacket seating section 18. Within this unthreaded zone sleeve 5 normally does not cut into the jacket 46.

Cable connector 1 according to the invention provides a low-cost connecting arrangement for the connection of a fiber optic cable, preferably a plastic light waveguide, to electro-optic transducers. Cable connector 1 according to the invention is also suited in particular for occasional coupling and/or uncoupling, with no special tools or assembly operations being required to accomplish this.

Thus, cable connector 1 is a one-piece component suited to accommodate electro-optic components such as transducers, preferably transmitters and receivers with amplifier, at the same time also connecting thereto the light waveguide or the cable 2.

When assembly cable connector 1, electro-optic transducers such as transmitter 11 and receiver 12 are permanently joined to cable connector 1, either by pressing them in or also by cementing them in.

Cable 2, preferably a plastic duplex light waveguide cable, is prepared for the connection either by simply cutting it off with a sharp knife or, if the specified transmission characteristics are high, by a simple polishing operation, or else by inexpensively sawing it off. The actual connecting operation requires merely the introduction of cable 2 into holes 30, 31 provided for the connection. The connection concludes by screwing threaded sleeve 5 onto cable connector 1 in the area of its cable seating section 19. When screwing sleeve 5 on, a cut is made in that portion of the plastic outer jacket of cable 2, e.g. designed as a plastic light waveguide, which projects into the thread turn, thereby connecting it in a tensionproof manner to the cable connector. Since cable seating section 19 is partly slotted, the two semicircular cable fixing elements 32 and 33 are being pressed against the cable due to the missing thread in the area of core hole 7, thereby bringing about an additional clamping action.

In case the transmission line is damaged or it is restructured with a new light waveguide or cable, the connection can easily be broken by unscrewing the sleeve 5 to make a new connection. In principle, the process can be repeated any number of times.

Figure 8:
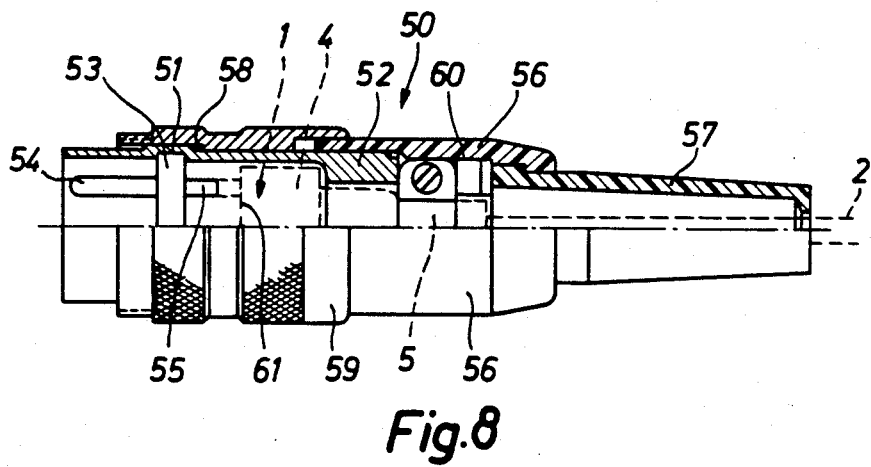
FIG. 8 is a conventional plug connector suited to accommodate the cable connector according to the invention.

FIG. 8 illustrates that cable connector 1 according to the invention, forming a connecting element, is designed so that it can be used for the connection of a duplex light waveguide cable line in a standard five-pole cylindrical plug connector. An example of such a connector is the C 91 series available from Amphenol-Tuchel Electronics GmbH, Heilbronn, Germany.

FIG. 8 shows a plug connector 50 of the C 91 series, there being housed in a space 61 formed by the plug the cable connector 1 according to the invention, shown is dashed lines in FIG. 8.

In detail, plug connector 50 consists in a known manner of two half-shells 52 which form the already-mentioned space 61 in which is also retained at 51 a contact insert 53. Contact insert 53 has contact pins 54 projecting outwardly and contact pins 55 projecting inwardly. The electro-optic transducer leads marked 14 and 15 in FIG. 1 can be soldered directly to contact pins 55, resulting in a complete unit comprising cable connector 1 and contact insert 53. This unit can practically be handled as one part and is installed in the plug cavity 61 after fastening cable 2 in cable connector 1.

Plug connector 50 further has in a known manner a retaining ring 58 for the two half-shells 52. The internal thread of a housing ring 56 is screwed at 60 to an external thread provided on both half-shells 52. An antibuckling sleeve 57 is located in the housing ring 56. Finally, a cap nut (threaded ring) 59 provides for fastening to a mating plug connector. Thus, this embodiment example of the invention provides a simple hybrid plug with electrical contacts and an optic transmission line.

Figure 9:
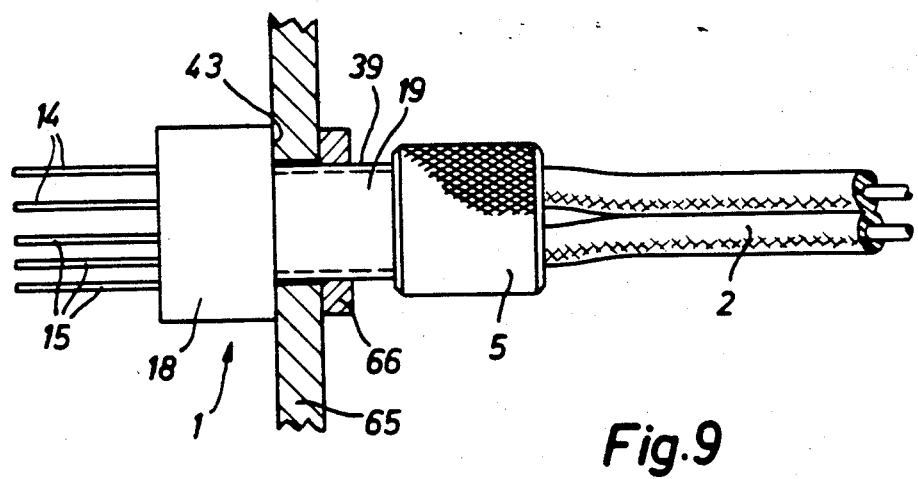
FIG. 9 shows the mounting of the cable connector according to the invention to an apparatus wall.

FIG. 9 shows another embodiment example of the invention where cable connector 1 is fastened to an apparatus wall 65, using a threaded nut 66. Nut 66 may also be screwed to external thread 39 of cable seating section 19. The back surface 43 of transducer seating section 18 rests against the surface of wall 65 opposite nut 66. If it is intended to break the connection between cable 2 and the optic transducers in transducer seating section 19 in this arrangement, it is necessary to unscrew cable fastening part 5 in the form of the sleeve and the nut 66, whereupon cable 2 can be pulled out of cable seating section 19. Conversely, the process can be reversed in equally simple manner to establish a connection. This is not the case in conventional, expensive plug connectors because the cable is usually fixed permanently in a plug connector by glueing or clamping. Consequently, when a cable is to be newly connected, the connection, carried out at high cost using the respective connecting method and special connecting tools, must be repeated. Only after the plug connector is connected is it possible to proceed in similar manner as described here for the exchange of the cable.

Figure 10:
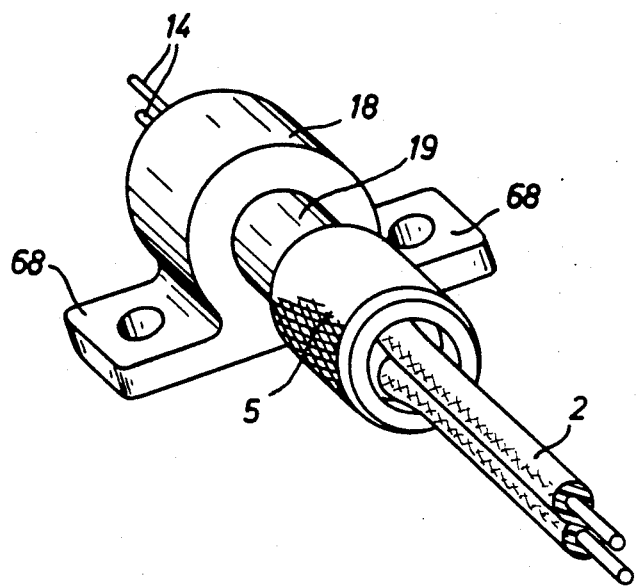
FIG. 10 shows the cable connector according to the invention for use on a chassis housing.

FIG. 10, in turn, shows the case where transducer seating section 18 forms retaining or clamping parts 68 which have holes to enable its fastening to a chassis. After transducer seating section 18 of FIG. 10 has been fastened to a chassis by means of its clamping parts 68 and leads 14 and 15 of the optic transducers contained in transducer seating section 18 connected to appropriate points on the chassis, cable 2 can be connected in the above-described manner and also be disconnected again should it become necessary to break the connection.

As in the preceding embodiment examples there is formed, in the same manner as described above in detail, a cable seating section 19, also as integral part of and adjacent to the transducer seating section 18 with the clamping parts 68. A cable fastening part 5 is also present in known manner. It is preferred that, as illustrated, transducer seating section 18, cable seating section 19 and clamping parts 68 constitute one piece which preferably is formed of plastic and is produced by injection molding. Leads 14 and 15 projecting out of the optic transducers in transducer seating section 18 are subsequently connectable to the chassis in suitable manner. For better understanding of the embodiment examples according to FIGS. 8 through 10, the embodiments of FIGS. 1 through 7 are referred to.

The embodiment examples illustrated show a cable connector 1 for a two-conductor cable (duplex light waveguide). It is possible, of course, that, on the basis of the principles of the invention, the cable connector can also be designed for a cable with only one fiber or also for a cable with more than two fibers. In each case the result is a compact, easy to assemble and disassemble cable connector 1 which is producible at low cost.

Regarding the embodiment of FIG. 10 it is also pointed out that it is also possible to insert the cable connector of FIG. 1 in a component having clamping parts as in FIG. 10 at 68. This component will then have an opening approximately corresponding to the outside dimensions of cable seating part 4, in which opening the cable connector can be retained such as by retention means, cable fastening part 5 then projecting through an appropriate hole.

Figure 11:
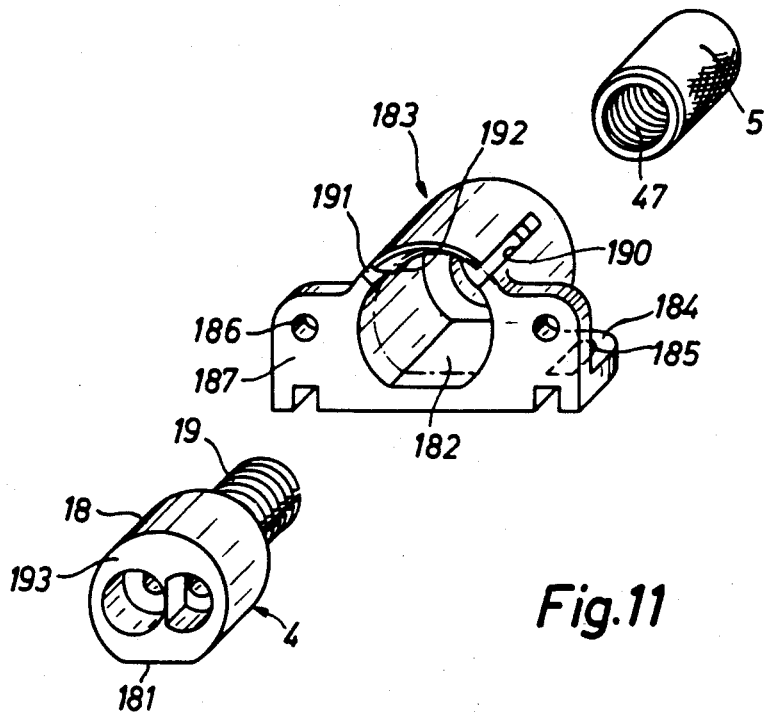
FIG. 11 is a perspective, exploded view of another embodiment example of the invention.

Such an embodiment example of the invention, modified compared to FIG. 10, is shown in FIG. 11 in a perspective, exploded view. One recognizes the already mentioned sleeve 5 with thread 47, the cable seating part 4 which, differing from the embodiment example of FIGS. 1 through 5, here forms by its transducer seating section 18 a horizontal guide surface 181 which interacts with a likewise horizontal guide surface 182 of a clamping part 183. Clamping part 183 may be fastened, for example, to a printed circuit board, utilizing the elongated holes 185 provided in two flanges 184 (only one is shown). Otherwise, it may also be fastened utilizing holes 186 in the face 187.

Guided by guide surfaces 181, 182, cable seating part 4 can be pushed into clamping part 183, and cable seating section 19 may protrude out of clamping part 183 through a hole not shown. The inside diameter of this hole is slightly larger than the outside diameter of cable seating section 19. When cable seating part 4 is installed, the back side of section 18 rests against the rear wall of clamping part 183. Slots 190, 191 in the plastic part 183 make an elastic snapping motion possible for the portion extending between slots 190, 191 with a locking edge 192 causing the part between slots 190, 191 to be raised as cable seating part 4 is being pushed in, whereupon locking edge 192 returns into its initial position shown when cable seating part 4 is completely inserted, thereby positioning itself in front of the face 193 of cable seating part 4, thus fixing this part.

Cable 2 is fastened as in the preceding embodiment examples, either before or after the insertion of cable seating part 4 into clamping part 183.

Figure 12:
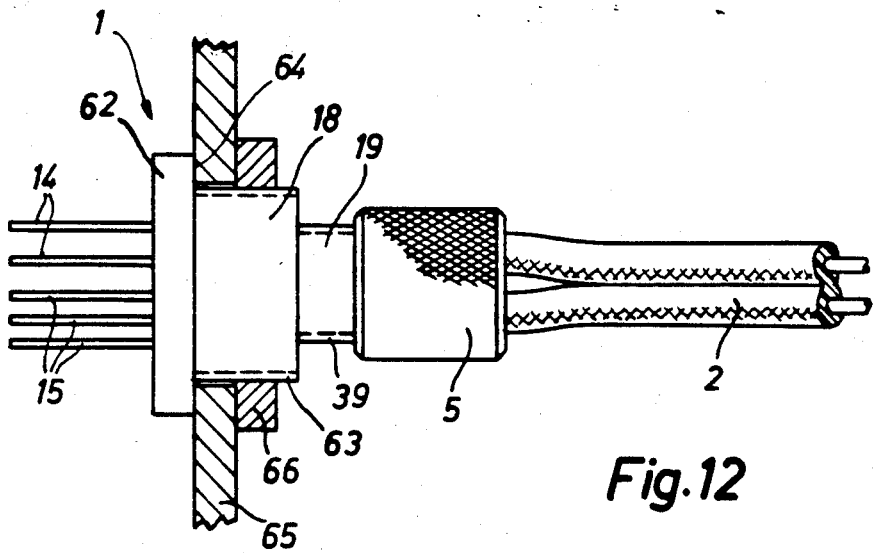
FIG. 12 is an embodiment example of the invention similar to that shown in FIG. 9.

FIG. 12 shows yet another embodiment of the invention, namely, a modification of the embodiment example of FIG. 9. While in the embodiment example of FIG. 9 both sleeve 5 and nut 66 need to be unscrewed to detach the cable 2, the embodiment example of FIG. 12 requires only the unscrewing of sleeve 5 for the same purpose.

For this purpose there is formed on transducer seating section 18 a collar 62 and a thread 63. Collar 62 is for making contact with wall 65. Threads 63 and 39, respectively, of cable seating section 19 and transducer seating section 18 extend through wall 65. Transducer seating section 18, in fact, extends through wall 65 as far as collar 62 will allow. Nut 66 for fastening transducer seating section 18 to wall 65 is here screwed to thread 63 of transducer section 18. The rear surface 64 of collar 62 then rests against the surface of wall 65 which is opposite to nut 66.

In contrast to the design of FIG. 9, only sleeve 5 has to be unscrewed to detach cable 2.

What is claimed is:

1. Cable connector for a fiber optic cable comprising a cable fastening part and a cable seating part, said cable fastening part being in the form of a sleeve having an internal thread, said cable seating part housing at least one electro-optic transducer therein and having at least one cable seating hole for receiving at least one jacketed optic fiber, said cable seating hole being parallel to an external thread on the cable seating part, said cable seating part having one or more slots parallel to and communicating with said cable seating hole such that when said cable fastening part is screwed onto said cable seating part, the internal thread of said sleeve partly cuts into the jacket of said cable through said one or more slots, thereby fixing the cable.

2. Cable connector according to claim 1, characterized in that the cable seating part comprises a transducer seating section and a cable seating section.

3. Cable connector according to claim 2, characterized in that at least one transducer seating cavity for at least one transducer is provided in said transducer seating section.

4. Cable connector according to claim 3, characterized in that said cable seating part is an integral plastic part.

5. Cable connector according to claim 4, characterized in that said transducer seating section and said cable seating section are disposed on the longitudinal axis of said cable connector so as to be adjacent and in alignment with each other.

6. Cable connector according to claim 5, characterized in that said transducer seating section positions transmitting or receiving surfaces, respectively, of said electro-optic transducer in one plane, and in that said cable is positioned in said plane by said electro-optic transducers so that enhanced transmission is possible at the point of contact between said transmitting and receiving surfaces, respectively, and contacting faces of the fiber(s).

7. Cable connector according to claim 1, characterized in that said cable comprises two fibers.

8. Cable connector according to claim 7, characterized in that when two jacketed fibers are used, the longitudinal axes of said cable seating holes are diametrically opposed and parallel to each other as well as to the longitudinal axis of said cable connector.

9. Cable connector according to claim 1, characterized in that two cable fixing elements for two jacketed fibers are formed by one slot, said slot cutting through a thread in said cable seating section at two diametrically opposed ends so that when said sleeve is screwed on, the jacket of the two fibers is partly cut in said ends.

10. Cable connector according to claim 1, characterized in that said cable connector is fastened to contact pins of a contact insert of a plug connector by means of contact pins of said transducer.

11. Cable connector according to claim 10, characterized in that a unit comprised of said contact insert and said cable connector is disposed in the interior of a plug connector.

12. Cable connector according to claim 2 for installation on an apparatus wall, characterized in that a collar and a thread are formed on said transducer seating section, said collar resting against said wall, both said cable seating section and said transducer section with said thread extending through the wall and including a nut screwed onto said thread, thereby fastening said cable connector to said apparatus wall, and wherein said cable fastening part is in the form of a sleeve screwed onto said cable seating section adjacent to said nut, thereby fixing said cable.

13. Cable connector according to claim 3, characterized in that there are formed on said transducer seating section clamping parts for fastening to a chassis, the leads from said transducer housed in said transducer seating section being connectable to said chassis and, wherein said sleeve is secured on an external thread of said cable seating section projecting from said transducer seating section.

14. Cable connector according to claim 3, characterized in that a housing is provided which has a clamping part and in which a cavity is formed to receive said cable seating part of said cable connector, and including detention means engaging said cable seating part to fix it in said cavity.

15. Cable connector according to claim 1, characterized in that there are provided hole parts in the cable seating part which are aligned with said holes in said cable seating section.

16. Cable connector according to claim 2, characterized in that a horizontal guide surface is provided in said transducer seating section to interact with a corresponding guide surface provided on a clamping part.

* * * * *